US010002310B2

(12) United States Patent
Gopalan et al.

(10) Patent No.: US 10,002,310 B2
(45) Date of Patent: Jun. 19, 2018

(54) METHOD AND APPARATUS FOR ORGANIZING MEDIA CONTENT

(71) Applicant: AT&T Intellectual Property I, LP, Atlanta, GA (US)

(72) Inventors: Raghuraman Gopalan, Freehold, NJ (US); Lee Begeja, Gillette, NJ (US); David Crawford Gibbon, Lincroft, NJ (US); Zhu Liu, Marlboro, NJ (US); Amy Ruth Reibman, Chatham, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 99 days.

(21) Appl. No.: 14/264,697

(22) Filed: Apr. 29, 2014

(65) Prior Publication Data

US 2015/0310309 A1    Oct. 29, 2015

(51) Int. Cl.
*G06K 9/62* (2006.01)
*G06K 9/46* (2006.01)
(Continued)

(52) U.S. Cl.
CPC ....... *G06K 9/6218* (2013.01); *G06F 17/3028* (2013.01); *G06K 9/00711* (2013.01);
(Continued)

(58) Field of Classification Search
CPC ......... G06F 17/30247; G06F 17/30265; G06F 17/3028; G06F 17/30256
See application file for complete search history.

(56) References Cited

U.S. PATENT DOCUMENTS 7,130,864 B2    10/2006    Lin et al.
7,756,334 B2    7/2010    Kim et al.
(Continued)

FOREIGN PATENT DOCUMENTS

AU    2011202609 A1    12/2012
AU    2012217920 A1    5/2013
(Continued)

OTHER PUBLICATIONS

Datta, Ritendra et al., "ACQUINE: Aesthetic Quality Inference Engine—Real-time Automatic Rating of Photo Aesthetics", Proceedings of the international conference on Multimedia information retrieval. ACM, 2010.
(Continued)

*Primary Examiner* — Kim Vu
*Assistant Examiner* — Michael Vanchy, Jr.
(74) *Attorney, Agent, or Firm* — Guntin & Gust, PLC; Douglas Schnabel

(57) ABSTRACT

A method that incorporates teachings of the subject disclosure may include, for example, determining, by a system comprising a processor, more common features of a plurality of images according to similarity matrices indicating relative similarities between instances of common features occurring within multiple images of the plurality of images, defining, by the system, cluster groups associated with the more common features, where each cluster group comprises cluster images of the plurality of images, and where the more common features are present in each the cluster images, and performing, by the system, quality-based filtering on the cluster images to identify a target cluster image to represent the cluster images for each of the cluster groups. Other embodiments are disclosed.

20 Claims, 8 Drawing Sheets

(51) Int. Cl.
*G06F 17/30* (2006.01)
*G06K 9/00* (2006.01)

(52) U.S. Cl.
CPC ........... *G06K 9/00751* (2013.01); *G06K 9/46* (2013.01); *G06K 9/6215* (2013.01); *G06K 9/6228* (2013.01); *G06K 9/6267* (2013.01)

(56) References Cited

U.S. PATENT DOCUMENTS

| | | | |
|---|---|---|---|
| 7,801,893 | B2 | 9/2010 | Gulli" et al. |
| 7,908,558 | B2 | 3/2011 | Obrador et al. |
| 8,189,880 | B2 | 5/2012 | Wen et al. |
| 8,275,172 | B2 | 9/2012 | Wilby et al. |
| 8,300,953 | B2 | 10/2012 | Lindley et al. |
| 8,345,934 | B2 | 1/2013 | Obrador et al. |
| 8,352,465 | B1 | 1/2013 | Jing et al. |
| 8,392,415 | B2 | 3/2013 | Wan |
| 8,463,030 | B2 | 6/2013 | Boncyk et al. |
| 8,542,950 | B2 | 9/2013 | Berg et al. |
| 8,571,331 | B2 | 10/2013 | Cifarelli |
| 8,571,333 | B2 | 10/2013 | Denney et al. |
| 8,620,026 | B2 | 12/2013 | Datta et al. |
| 8,626,758 | B2 | 1/2014 | Alspector et al. |
| 2002/0097914 | A1* | 7/2002 | Yaung ............... G06K 9/6807 382/225 |
| 2006/0155684 | A1* | 7/2006 | Liu ................ G06F 17/30274 |
| 2006/0159442 | A1 | 7/2006 | Kim et al. |
| 2008/0279424 | A1* | 11/2008 | Berrani et al. ............... 382/118 |
| 2009/0067742 | A1* | 3/2009 | Lim .................. G06T 5/20 382/263 |
| 2011/0029510 | A1* | 2/2011 | Kroon et al. ................. 707/723 |
| 2011/0129159 | A1* | 6/2011 | Cifarelli ..................... 382/224 |
| 2011/0305399 | A1 | 12/2011 | Zitnick et al. |
| 2012/0265611 | A1 | 10/2012 | Bookman et al. |
| 2012/0269441 | A1 | 10/2012 | Marchesotti et al. |
| 2013/0011083 | A1 | 1/2013 | Berkovich et al. |
| 2013/0148864 | A1* | 6/2013 | Dolson et al. ............... 382/115 |
| 2014/0099026 | A1* | 4/2014 | Krishnaswamy .... H04N 1/6027 382/167 |
| 2014/0105505 | A1 | 4/2014 | Ioffe et al. |
| 2014/0201126 | A1* | 7/2014 | Zadeh ................. G06K 9/627 706/52 |

FOREIGN PATENT DOCUMENTS

| | | |
|---|---|---|
| EP | 1564684 A2 | 8/2005 |
| JP | 2001256244 A | 9/2001 |
| KR | 20030005908 | 1/2003 |
| KR | 20100079514 | 7/2010 |

OTHER PUBLICATIONS

Jingyu, Cui et al., "EasyAlbum: an interactive photo annotation system based on face clustering and re-ranking", Proceedings of the SIGCHI conference on Human factors in computing systems. ACM, 2007.

Ke, Yan et al., "The Design of High-Level Features for Photo Quality Assessment", Computer Vision and Pattern Recognition, 2006. IEEE Computer Society Conference on. vol. 1. IEEE, 2006.

Luo, Yiwen et al., "Photo and Video Quality Evaluation: Focusing on the Subject", Computer Vision—ECCV 2008. Springer Berlin Heidelberg, 2008. 386-399.

Platt, John C. , "AutoAlbum: Clustering Digital Photographs using Probabilistic Model Merging", Content-based Access of Image and Video Libraries, 2000. Proceedings. IEEE Workshop on. IEEE, 2000.

Sinha, Pinaki et al., "Personal Photo Album Summarization", Proceedings of the 17th ACM international conference on Multimedia. ACM, 2009.

Begeja, Lee, "VidCat: an image and video analysis service for personal media management", Proceedings of SPIE, vol. 8667, Mar. 7, 2013 (Mar. 7, 2013), p. 86670F.

Frigui, Hichem et al., "Clustering and aggregation of relational data with applications to image database categorization", Pattern Recognition, Elsevier, GB, vol. 40, No. 11, Jul. 16, 2007 (Jul. 16, 2007), pp. 3053-3068.

Lantz, Steve , "Data Analysis with MATLAB", Jan. 19, 2012 (Jan. 19, 2012), XP055210769, Ithaca, New York, USA Retrieved from the Internet: URL:https://www.cac.cornell.edu/education/Training/Data12/DataAnalysisMatlabJan2012. pdf [retrieved on Sep. 2, 2015].

Rokach, Lior , "Clustering Methods", Data Mining and Knowledge Discovery Handbook (Second Edition), Jan. 1, 2010.

Wang, Xin-Jing et al., "Grouping Web Image Search Result", Proceedings of the 12th Annual ACM International Conference on Multimedia.

Yeung, Minerva M. et al., "Efficient matching and clustering of video shots", Proceedings of the International Conference on Image Processing. (ICIP). Washington, Oct. 23-26, 1995.

Yeung, Minerva M. et al., "Time-constrained clustering for segmentation of video into story units", Proceedings of 13th International Conference on Pattern Recognition, Jan. 1, 1996 (Jan. 1, 1996), p. 375.

"International Preliminary Report on Patentability", PCT/US15/27205, dated Nov. 1, 2016.

\* cited by examiner

300

350

400

METHOD AND APPARATUS FOR ORGANIZING MEDIA CONTENT

FIELD OF THE DISCLOSURE

The subject disclosure relates to a method and apparatus for organizing media content, and, more particularly, for automatically organizing images into cluster groups.

BACKGROUND

Media content is typically experienced by consumers via devices such as computers, televisions, radios, and mobile electronics. Media content can be created by many kinds of entities including traditional producers of content, such as professional artists, studios, and broadcasters. Today, the proliferation of video cameras, especially as integrated into mobile communication devices, has resulted in a large amount content generated by consumers of content. Modern communications networks provide interconnectivity between consumers and various communication and storage devices. As network capabilities expand, these interconnections provide new opportunities to enhance the ability for consumers to enjoy media content by experiencing a variety of content over multiple devices.

BRIEF DESCRIPTION OF THE DRAWINGS

Reference will now be made to the accompanying drawings, which are not necessarily drawn to scale, and wherein.

DETAILED DESCRIPTION

Figure 1:
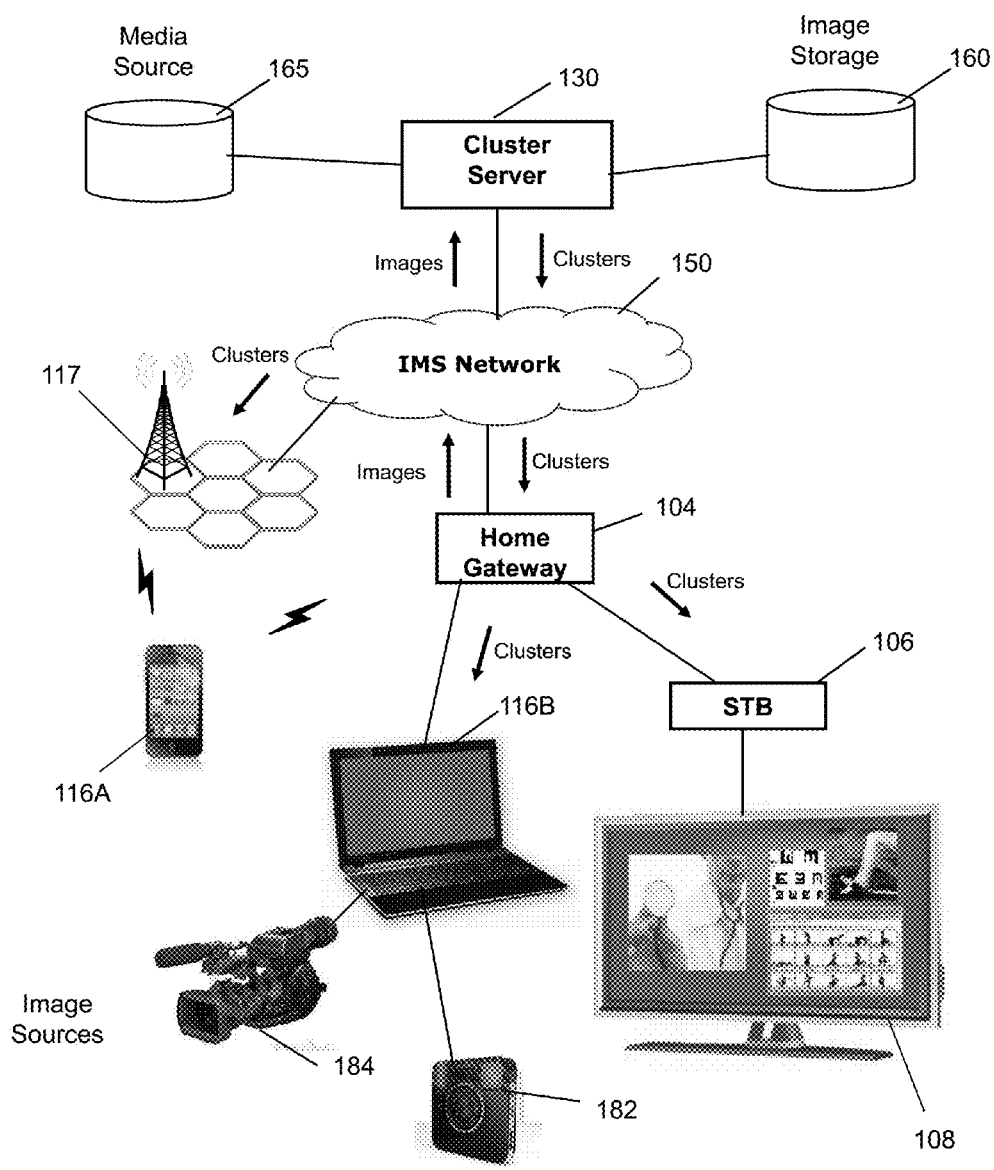
FIG. 1 depicts illustrative embodiments of a system that can be utilized for collecting and automatically organizing images into cluster groups.

The subject disclosure describes, among other things, illustrative embodiments for automatically organizing a set of images into clusters of images. Images, such as those captured via a camera or those scanned from video images, can be analyzed to detect features. The features can include 2D information and/or 3D information. The detected features of the group of images can be further analyzed to determine similarity metrics between the images. An estimate of an initial number of clusters of images can be determined by evaluating a range of cluster values and associating this range of cluster values with output performance using the similarity metrics. Quality-based filtering can be performed on the clusters to determine a possible subset of images to represent the clusters, such as the best subset of images.

One embodiment of the subject disclosure includes a device comprising a processor and a memory that stores executable instructions that, when executed by the processor, facilitate performance of operations, including detecting a plurality of features present in a plurality of images. The processor can perform operations including identifying, from the plurality of features, a plurality of common features that are present in multiple images of the plurality of images. The processor can further perform operations including determining, from the plurality of common features, a plurality of similarity matrices indicating relative similarities between instances of the plurality of common features occurring in the multiple images. The processor can perform operations including selecting, from the plurality of common features, a plurality of more common features according to the plurality of similarity matrices. The processor can perform operations including defining a plurality of cluster groups. Each cluster group can be associated with one more common feature of the plurality of the more common features. Each cluster group can comprise a plurality of cluster images of the plurality of images. The one more common feature can be present in each the plurality of cluster images. The processor can perform operations including performing quality-based filtering on the plurality of cluster images to identify a target cluster image to represent the plurality of cluster images for each of the cluster groups and presenting the target cluster images for each of the cluster groups.

One embodiment of the subject disclosure includes a machine-readable storage medium, comprising executable instructions. The executable instructions can cause a processor to perform operations including determining, from common features of a plurality of images, similarity matrices indicating relative similarities between instances of the common features occurring within multiple images of the plurality of images. The executable instructions can also cause the processor to perform operations including selecting, from the common features, more common features according to the similarity matrices. The executable instructions can further cause the processor to perform operations including defining cluster groups associated with the more common features, wherein each cluster group comprises cluster images of the plurality of images. The more common features can be present in each of the cluster images. The executable instructions can cause the processor to perform operations including performing quality-based filtering on the cluster images to identify a target cluster image to represent the cluster images for each of the cluster groups and presenting the target cluster image for each of the cluster groups.

One embodiment of the subject disclosure includes a method including determining, by a system comprising a processor, more common features of a plurality of images according to similarity matrices indicating relative similarities between instances of common features occurring within multiple images of the plurality of images. The method can include defining, by the system, cluster groups associated with the more common features. Each cluster group can comprise cluster images of the plurality of images. The more common features can be present in each the cluster images. The method can further include performing, by the system, quality-based filtering on the cluster images to identify target cluster images to represent the cluster images for each of the cluster groups.

Figure 2:
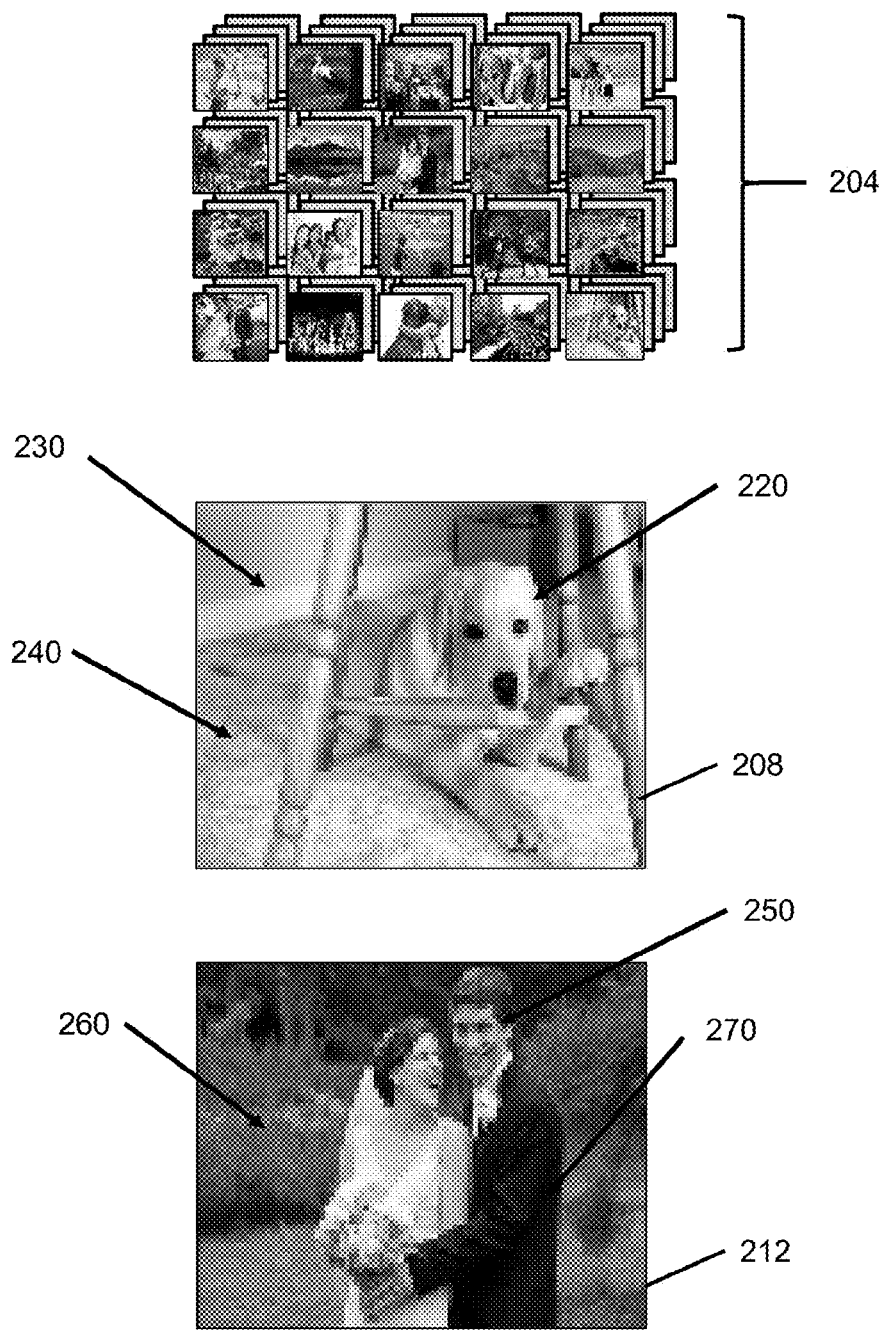
FIGS. 2, 3A, and 3B depict exemplary images illustrating, in part, media programming generated according to the systems of FIGS. 1, 5, and 6, and the method of FIG. 4.
Figure 3A:
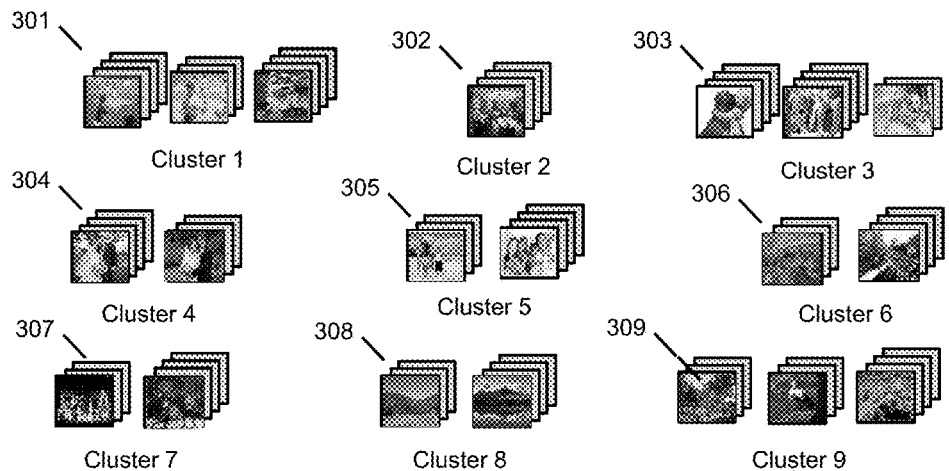
Figure 3B:
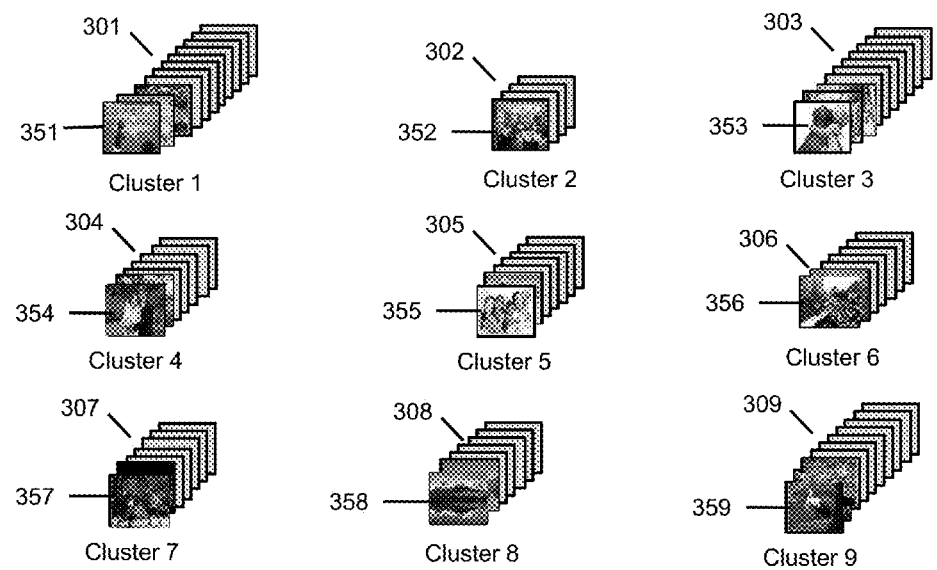

FIG. 1 depicts an illustrative embodiment of a system 100 that can be utilized for automatically generating clusters from data images. FIGS. 2, 3A, and 3B depict exemplary images illustrating, in part, automatically generating cluster groups from a set of images according to the system of FIG. 1.

In one or more embodiments, the system 100 can include a communication network 150. The system 100 can include a subscription telecommunication service, such as an Internet Protocol Multimedia Subsystem (IMS) network 150 for providing cellular/mobile communications, Internet access, and content to mobile communication devices 116A via a mobility network of mobile base stations 117. The system can include a subscription content service, such as an Internet Protocol Television (IPTV) network for providing media content to subscribers. The IPTV network can be part of a cable, satellite, or DSL based media content delivery system. The media content can be any type of viewable content, such as broadcast television, cable or premium television, video on demand, or pay-per-view television. The IPTV network can deliver media content to media processing devices 106 and media display devices 108 at subscriber locations via gateway devices 104. In one or more embodiments, the system 100 can include wireless computer devices 116B that are connected to the communication network 150. For example, a wireless computer device 116B can be coupled to the communication network 150 via a gateway device 104.

In one or more embodiments, the system 100 can include one or more local or consumer-end image sources. For example, the system 100 can include a mobile communication device 116A that includes a camera for capturing images. In another example, the system 100 can include a video camera 184 and/or a still image camera 182. The system 100 can capture content from any of these consumer-end sources 116A, 182, and 184. In one or more embodiments, the system 100 can include one or more remote media sources 165. The system 100 can store images, which can be still images and/or video data, at an image storage device 160.

In one or more embodiments, the system 100 can include one or more cluster servers 130 that are associated with the IMS network 150. In another embodiment, one or more cluster servers 139 can operate in a home or business environment and/or location. In one embodiment, a cluster server 130 can communicate with images sources 116A, 184, and 182, and a media source 165 over the IMS network 150. The cluster server 130 can communicate with an image storage device 160. The cluster server 130 can further communicate with media processor devices 106 and media display devices 108 over the IMS network 150. The mobile communication device 116 can communicate with the IMS network 150 using one or more components of a mobility network 117, such as cellular base stations for receiving and transmitting wireless communication signals.

In one or more embodiments, a media processor device 106 can communicate with a cluster server 130 via the IMS Network 150 by way of a gateway device 104. The media processor device 106 can receive user inputs from a remote control device for performing functions, such as powering ON/OFF, selecting channels for viewing media programs, adjusting volume, and/or programming a digital video recorder. The media processor device 106 can receive a user input for selecting a media program and/or a channel for receiving a media program. In one example, the media processor device 106 can present an electronic programming guide at a media device 108 for assisting in the selection of media programming. In one or more embodiments, the media processor device 106 can receive cluster group images from the cluster server 130 so that a viewer of the media device 108 can easily review images.

In one or more embodiments, the cluster server 130 can receive stored images 204 from an image storage device 160. For example, the image storage device 160 can be cloud-based storage, dedicated server storage, or networked storage devices, even local storage devices that are linked to the network 150 via software. The image storage device 160 can receive images from local image sources 184, 182, 116A, and 116B. For example, image data can be uploaded from the image sources 184, 182, 116A, and 116B to the image storage device 160. Uploading events can be locally directed at the local image sources 184, 182, 116A, and 116B, or can be directed by the image storage device 160, the cluster server 130, or another network device. The image storage device 160 can receive image date from a network media source 165. The media source 165 can be a source for broadcast programming or video-on-demand (VOD) programming the IMS network 150. For example, a copy of all or part of a broadcast or VOD program can be stored at the image storage device 160. In another embodiment, image and/or video content from a social networking system or site can be shared with the image storage device 160.

Image data at the image storage device 160 can be stored as video content, and/or still image content. Video content can be broken down into screen captures of still images. Image data can be stored on a per user basis, where the data is only accessible to the user, or owner, of the data. For example, a user or subscriber to a cloud-based storage service can store a set of images in the form of video and/or pictures on the image storage device 160. The user can access this content remotely via a web-based portal or a client application at a device, such as a mobile communication device 116A. The user can add images, delete images, edit images, and manually categorize or organize images stored at the image storage device 160. Access to the images can be protected via authorization procedures, such as passwords or digital certificates or encryption. The user or subscriber can upload image data that is generated at a user device, such as images captured with a camera at a mobile communication device 116A or via a stand-alone video camera 184. In another embodiment, the user can upload third-party generated data, such as video content or still images, onto the image storage device 160. This provision can include a subscription service to provide copyright licensing for accessing, storing, and using the image content. For example, a user or subscriber can participate in a licensing agreement that bestows permission to store a copy of all or part of a video or an image onto the image storage device 160.

In one or more embodiments, a set of images 204 in FIG. 2 can be stored for a user or subscriber at the image storage device 160. The set of images can be pictures and/or still image captures of video. The set of images 204 can originate for a single device, such as a mobile communication device 116A, or several devices. The set of images 204 can include images captured by a user or subscriber devices or images captured by other parties. In one embodiment, all of a user or subscriber's images that are stored at the image storage 160 can be included in the set of image 204 that are to be subject to clustering. In another embodiment, the set of image 204 can be a subset of the total images stored for the user or subscriber. For example, the set of images 204 can include only newly uploaded images, images bearing date stamps of specific time periods, or images that the user or subscriber has indicated belong in the set of images 204.

A user or subscriber can take large quantities of digital photos, which are included in the set of images 204. In one or more embodiments, subsets of the set of images 204 can be clustered into groups or clusters 301-309 in FIG. 3 that convey the essence of the large set of images 204. The cluster groups 301-309 can be clustered or selected according to subject matter that can be interesting and important from a user experience perspective, and can facilitate conservation network resources. For example, a representative sample 351 of a single cluster group 301 or representative samples 351-359 of multiple cluster groups 301-309 can be presented to the user or subscriber, rather than presenting the entire album or set of images 204. In one or more embodiments, subsequent photos or images can be presented based on the user's interest in the one or more cluster groups that are presented in representative form.

In one or more embodiments, image features 220-270 can be extracted from images 208 and 212 from the image set 204. Cluster groups 301-309 can be determined based on similarity metrics between the extracted images based on the extracted features 220-270. Rather than predetermining a number of cluster groups 301-309, the number can be automatically determined based on these similarities. The clustering groups can further incorporate a notion of image quality to improve a user experience perspective by providing clustering groups outputs that have target or best quality images.

In one or more embodiments, the clustering groups can be formed based on deep learning via a process of feature selection and subsequent grouping of images. Rather than performing classification of image data based on supervision or labeling of data, clustering is performed according to an unsupervised process or clustering image data where the data from the set of images 204 can be unlabeled and unsupervised. In one or more embodiments, the clustering framework integrates one or more objectives. For example, target or best image features 220-270 can be selected for clustering. Two-dimensional feature information 230, 240, 260, and 270, such as image intensities, edges, contours, textures, shape signatures, appearance models, and/or local interest point descriptors, can be detected to obtain similarity metrics between images. Three-dimensional models of typical objects and/or scene layouts, such as those using surface normal and volumetric configurations, can also be detected in image scenery to obtain similarity metrics between images.

In one or more embodiments, an initial number of clusters 301-309 can be estimated for the image set 204. A range of cluster values can be evaluated. Each of these cluster group values can be associated with output performance for each of the cluster groups 301-309 using the similarity metrics. In one or more embodiments, the clusters groups 301-309 can be updated whenever more images are added to the album or set of images 204. In one or more embodiments, combinations of the earlier steps of estimating a number of cluster groups 301-309 and evaluating the cluster groups 301-309 according to the similarity metrics between images to refine the existing cluster groups 301-309 with the new images as well as to determine if additional cluster groups 301-309 need to be created to present a more inclusive subset of images to the user.

In one or more embodiments, the cluster groups 301-309 that are generated are subjected to quality-based filtering of the images that have been placed into the groups. In one or more embodiments, the image quality metrics can be used to choose the target or best possible subset of images, or even a single image, as reference images 351-359 for the cluster groups 301-309. In one or more embodiments, the image quality metrics can include "no-reference" quality estimators. A "no-reference" quality estimator is a quality estimate of an image, where the a measured quality of an image, such as blur or compression artifacts, can be independently evaluated without reference to a known-good image.

In one or more embodiments, target or best quality images 351-359 can be selected from the identified cluster groups 301-309 using, for example, a "no-reference" method. In one or more embodiments, no-reference quality analysis can be used to evaluate the images 208 and 212 to identify those images 208 and 212 with target or best quality, such as least blur, fewest compression artifacts, least noise (such as during low-light capture), or greatest color saturation.

In one or more embodiments, a face detection method can be applied to the images 208 and 212. If the images 208 and 212 are found to contain faces 220 and 250, then the method can determine which of the face-containing images contains a face 220 or 250 that is closest to a "full frontal" orientation or where a person or animal has the broadest smile or best expression.

Figure 4:
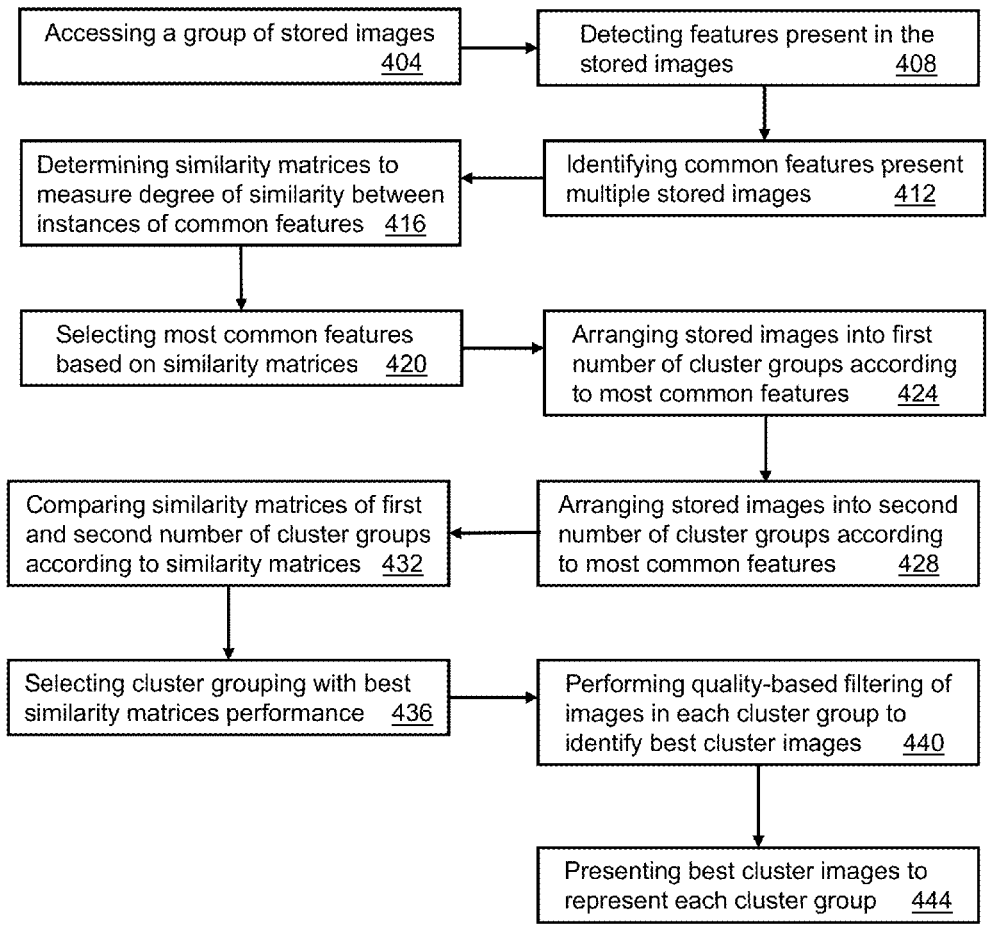
FIG. 4 depicts an illustrative embodiment of a method operating in portions of the system described in FIGS. 1, 5, and 6.
Figure 5:
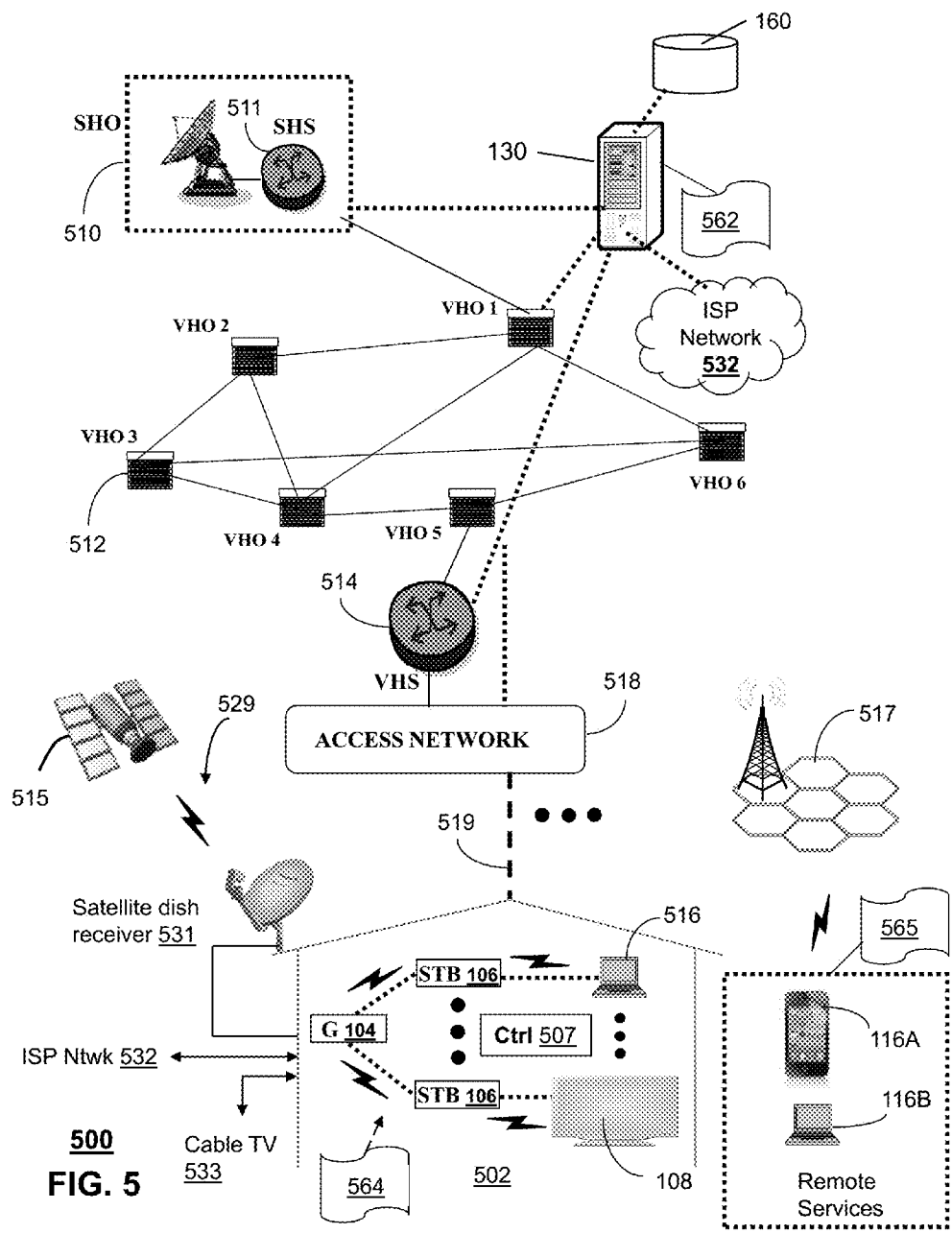
FIGS. 5 and 6 depict illustrative embodiments of communication systems for collecting and organizing images into cluster groups according to embodiments illustrated in FIGS. 1, 5, and 6.
Figure 6:
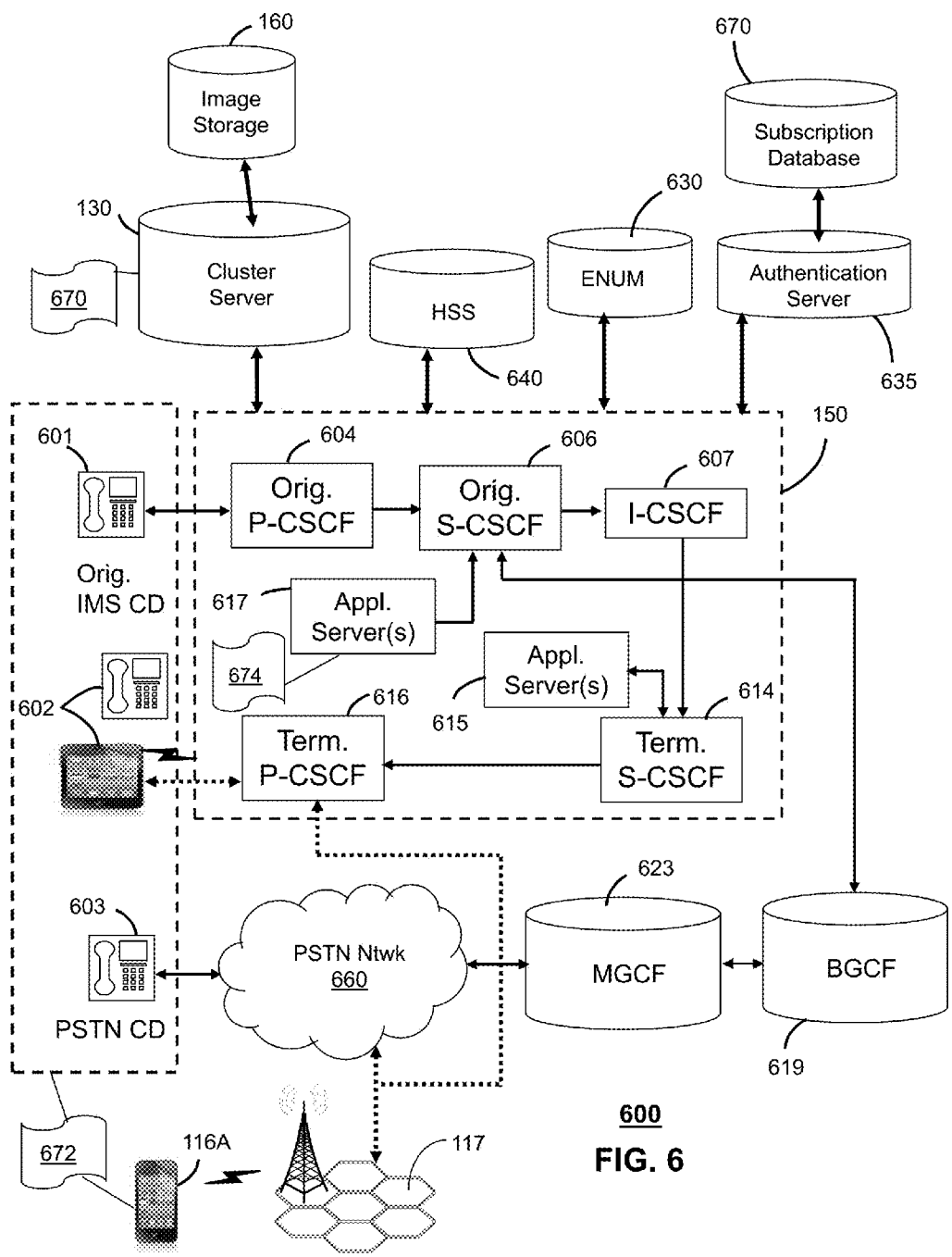

FIG. 4 depicts an illustrative embodiment of a method operating in or using portions of the system described in FIGS. 1, 5, and 6. It should be understood that, while the steps of method 400 are shown in a particular arrangement, these steps of method 400 can be performed in any order, can be repeated, and/or can be looped in any arrangement within the scope of the embodiments herein described. Method 400 can begin with step 404, in which the cluster server 130 can access stored images from an image storage device 160. The stored images can originate from one or more local or consumer-end image sources, such as a mobile communication device 116A that includes a camera for capturing images, a video camera 184 and/or a still image camera 182. In one or more embodiments, the stored images can alternatively or additionally originate from one or more remote media sources 165. The stored images can be still images and/or video data.

In one or more embodiments, the cluster server 130 can receive a set of stored images 204 from the image storage device 160. For example, the image storage device 160 can be cloud-based storage, dedicated server storage, or networked storage devices, or local storage on mobile communication devices 116A, video cameras 184, or still image cameras 182, or even local storage devices that are linked to the network 150 via software. The image storage device 160 can receive images from local image sources 184, 182, 116A, and 116B and/or from a network media source 165, such as a source for broadcast programming or video-on-demand (VOD) programming the IMS network 150.

Image data can be stored on a per user basis, a per device basis, or a per account basis. Access to the image data can be limited to, for example, a user, subscriber, or owner, of the data. For example, a user or subscriber to a cloud-based storage service can store a set of images in the form of video and/or pictures on the image storage device 160. The user can access this content remotely via a web-based portal or a client application at a device, such as a mobile communication device 116A. The user can add images, delete images, edit images, and manually categorize or organize images stored at the image storage device 160.

The user or subscriber can upload image data that is generated at a user device 116A and/or can upload third-party generated data, such as video content or still images, onto the image storage device 160. A set of images 204 can be stored for the user or subscriber at the image storage device 160. The set of images 204 can be made up of images originating from a single device or several devices. The set of images 204 can alternatively or additionally include images captured by the user or subscriber devices or images captured by other parties. All of the images that are stored at the image storage 160 can be included in the set of image 204 that are to be subject to clustering or that set of images 204 can be a subset of the total images stored. The set of images 204 can include only newly uploaded images, images bearing date stamps of specific time periods, or images that the user or subscriber has indicated belong in the set of images 204.

In one or more embodiments, image source devices, such as mobile communication devices 116A, can be information related to the image data. For example, a mobile communication device 116A can determine a location, time, date, and user of the device 116A at the moment that video or image stills were captured at a camera that is integrated into the device 116A. This image acquisition information can be provided to the cluster server 130 along with the image data. In another embodiment, the cluster server 130 can be provided with current information on the present and past location and recording usages of the device 116A. For example, the cluster server can determine that the device 116A was at a local zoo multiple times in the past year and/or during a time concurrent with the capture of images via the device 116A and/or at the present time. The cluster server 130 can use this information to infer conclusions regarding user/subscriber interest in certain themes or categories or images within the clustered groups. For example, the cluster server 130 can specifically search for image content consistent with a zoo or related to animals or the out of doors.

In step 408, the cluster server 130 can detect features present in the stored images. In one or more embodiments, image features 220-270 can be extracted from images 208 and 212 from the image set 204. In one or more embodiments, two-dimensional feature information 230, 240, 260, and 270, can be detected in the images. For example, each image 208 and 212 of the image set 204 can be read or scanned and intensities recorded for each pixel in the image. For example, if the image is a gray scale image that has been encoded using an 8-bit resolution, then each pixel can have any value between 0 and 255, where this value defines a level of intensity, or brightness, between white and black. If the image is a color image, then each pixel further includes three color values that specify levels of red, green, and blue present at that pixel location. Once the cluster server 130 has read the intensity and color values for each pixel in an image 208, then the image gradient information can be calculated for various parts of the image. An image gradient provides measure of directional changes in image intensity or color of an image.

In one or more embodiments, the cluster server 130 can use image gradient information to detect image edges, shapes, and textures. Generally, a large image gradient is predictive of an edge pixel location that defines a part of an image object. For example, an edge transition 230 between a medium intensity wall and light intensity baseboard of a room in image 208 creates a large image gradient for image pixels located along a line defining the top of the baseboard. Similar object edges can be detected by computing and comparing image gradients throughout the image 208. The edges can be used to detect and define image objects, such as legs of a chair and an image of dog.

In one or more embodiments, the cluster server 130 can use image intensity and gradient information to detect image textures. Further, the cluster server 130 can compute texture and feature signatures from the gradient information. These texture and feature signatures can be used to detect same or similar textures and/or object features between multiple images 208 and 212 while reducing matching errors that can be induced due to differences in lighting or exposure between images.

In one or more embodiments, the cluster server 130 can detect interest points 270 within the image 212. An interest point 270 can have a clear and well-defined definition, position, and/or structure in the image. Interest points 270, once detected and identified, can define a robust, stable, and well-defined image within the overall image, where that image can be easily detected in another image with a high degree of reliability. For example, the groom's coat 270 in the image 212 can be identified by the cluster server 130 as an interest point that may be easily detected in another image. In one or more embodiments, the two-dimensional analysis of the image 208 can further detect corners, blobs, and ridges.

In one or more embodiments, the cluster server 130 can also alternatively or additionally perform three-dimensional analysis or modeling of the image 212. The purpose of the three-dimensional analysis is recognition of objects, such as a human face 250, in the two-dimensional image. When an image of a face is included in a two-dimensional image, the facial is typically distorted from its true three-dimensional reality by the fact that it is mapped to two dimensions, oriented according to a translation and/or rotation, partially obstructed, and so forth. Two-dimensional facial images can, nevertheless, be recognized but can require further image processing beyond the two-dimensional processing described above. In one example, a face detection algorithm can be performed by the cluster server 130 to determine that an area of an image 212 corresponds to a face 250 and, further, that the face is associated with a known person. In one or more embodiments, the three-dimensional analysis can identify other three-dimensional objects, such as pets 220 and/or scenery 260. In one or more embodiments, the three-dimensional analysis of the image 208 can further detect three-dimensional shapes.

In step 412, the cluster server 130 can identify common features present in multiple stored images. In one or more embodiments, each of the features that are detected in the images 208 and 212 can be described mathematically using, for example, vectors and/or matrices. In one or more embodiments, the cluster server 130 can apply image reconstruction or restoration to the detected features to improve feature matching. For example, the cluster server 130 can determine that an image 212, or a portion of an image, has been subject to some form of image loss via blurring or compression or atmospheric condition. The cluster server 130 can then reconstruct the original image from the blurred or lossy image by applying a filter that corrects for the loss. In one or more embodiments, the cluster server 130 can compare features 220 detected in images 208 to all the features detected in all of the images in the set of images 204*l*

In step 416, the cluster server 130 can determine similarity matrices to measure the degree of similarity between instances of common features. A similarity matrix can be a matrix of scores that represent the similarity between a number of data points in a first image and a second image. In one or more embodiments, similarity matrices can be determined based on similarity of two-dimensional features detected in different images and/or similarity of three-dimensional features detected in different images. In one example, image intensity information can be represented by a two-dimensional matrix. In another example, color image information can be represented by three or more matrices. Linear mathematical manipulation, both in Euclidean and non-Euclidean forms, can be performed on the matrix representations of two images to calculate a disparity measures and/or image histograms for comparing the features of the two images. In one or more embodiments, similarity matrices can be computed for comparing each image 208 of the image set 204 with every other image 212 of the image set 204.

In step 420, the cluster server 130 can select more common features of the set of images 204 based on the similarity matrices. In one or more embodiments, the cluster server 130 can determine, by analyzing the similarity matrices between each image of the image set 204, the extent to which the detected features are common between the images of the image set 204. For example, an animal 220 can be detected in multiple images of the image set 204. The cluster server 204 can determine to what extent multiple images include detected animal images. In one or more embodiments, the cluster server 130 can rank the more (including most) common features of the images. In one or more embodiments, the common features can be two-dimensional feature and/or three-dimensional features.

In steps 424 and 428, the cluster server 130 can arrange the stored images into a first number of cluster groups and a second number of cluster groups according to the more and/or most common features. In one or more embodiments, the first number of cluster groups can be a different number of clusters than the second number of cluster groups. For example the cluster server 130 can form a first number of ten cluster groups of similar images from the set of images 204 and a second number of twelve cluster groups of similar images form the same set of images 204. In both cases, the cluster groups can be based on grouping together images with common and similar features. In step 432, the cluster server 130 can compare similarity matrices of the first number of cluster groups and the second number of cluster groups according to the similarity matrices. In step 436, the cluster server 130 can select the cluster groups 301-309 with the target or best similarity matrices performance. For example, if the second number of clusters, including twelve cluster groups, exhibits better similarity matrices than the first number of clusters, including ten cluster groups, then the cluster server 130 can select the second number of cluster groups 301-309.

In step 440, the cluster server 130 can perform quality-based filtering of images in each of the cluster groups to identify the target or best cluster images to represent each cluster group. In one or more embodiments, the cluster groups 301-309 that are generated are subjected to quality-based filtering of the images that have been placed into the groups. In one or more embodiments, the image quality metrics can be used to choose a target or best possible subset of images, or even single images, as reference images 351-359 for the cluster groups 301-309. In one or more embodiments, the image quality metrics can include "no-reference" quality estimators. For example, a "no-reference" quality analysis can be used to evaluate the images 208 and 212 to identify those images 208 and 212 with best quality, such as least blur, fewest compression artifacts, least noise, and/or greatest color saturation. In one or more embodiments, a face detection method can be applied to the images 208 and 212. If the images 208 and 212 are found to contain faces 220 and 250, then the method can determine which of the face-containing images contains a face 220 or 250 that is closest to a "full frontal" orientation or where a person or animal has the broadest smile or best expression.

In step 444, the cluster server 130 can present the target or best cluster images 351-359 to represent each of the cluster groups 301-309. For example, the cluster server 130 can transmit the target or best cluster images 351-359 to the mobile communication device 116A for presentation at a display at the mobile communication device 116A. In other embodiments, the cluster server 130 can transmit the target or best cluster images 351-359 to a computer device 116B and/or to a display device 108 via a set-top box 106. In one or more embodiments, a user or subscriber to the cluster server 130 can select the representative image 351 for a cluster group 301. The cluster server 130 can detect this selection and can transmit all or part of other images of that cluster group 301 to the user/subscriber device. In this way, the system 100 can minimize usage of system bandwidth resources for sending images until the user/subscriber indicates an interest in the cluster group 301 by selecting the representative image 351.

In one or more embodiments, the cluster server 130 can automatically estimate the number of cluster groups needed without user intervention. In one or more embodiments, the automatic clustering can subsequently respond to user/subscriber interaction with the clusters to seed the cluster server 130 for further development of the cluster groups. For example, if the user/subscriber selects a representative image 353 including pets and/or children, then the cluster server 130 can detect an interest level in this subject matter. Subsequently, as additional images are received and/or accessed by the cluster server 130, then the cluster server 130 can analyze these images for children and/or pet features and can either add these images to the same cluster group 303 and/or can create new cluster groups directed to this subject matter.

In one or more embodiments, the cluster server 130 can apply the clustering technique to video segments. In one example, one or more videos can be subdivided into video snippets. The clustering analysis can then be performed on the video snippets as individual images. In one or more embodiments, the cluster server 130 can extract the features 220 in the images 208 before the images are organized into cluster groups 301-309. In one or more embodiments, a pre-seeding configuration can be applied to the clustering process such that the cluster groups incorporate knowledge of preferred content or feature types prior to the clustering.

In one or more embodiments, the method makes it easy for a user/subscriber to sort through the set of images 204 by allowing software to aid the user/subscriber to view representative samples. In one or embodiments, the cluster server 130 can determine which images to present according to which images the user/subscriber likes. This method allows the user/subscriber to save a large number of images in storage, while efficiently using network resources to move pictures. Loading of network resources and costs to the user and the service provider can be minimized.

In one or more embodiments, clusters can be arranged according to a timeline for the images, a sequence of events, persons capturing the images or captured within the images, and/or a location of where images were captured or where a display device 108 or mobile communication device 116A is currently located. In one or more embodiments, the image cluster groups 301-309 can be arranged for presentation according to similarity distancing between images. Closely-related content can be closely grouped and presented for display. Widely-spaced content (content that is not similar) can be presented in larger groupings. Cluster groups can have multiple properties and categorical relations. For example, group A could be closer to group C but farther from B In one or more embodiments, clustering can be done locally, at, for example, a mobile communication device 116A. In other embodiments, the clustering can be done incrementally. In one or more embodiments, a partial analysis can be performed on a part of a photo cache or part of a video, etc. Also, clustering can be on-going so that cluster groups can change over time as new images are added.

FIG. 5 depicts an illustrative embodiment of a first communication system 500 for delivering media content. The communication system 500 can represent an Internet Protocol Television (IPTV) media system. Communication system 500 can be overlaid or operably coupled with the system of FIG. 1 that can be utilized for automatically organizing a set of images into clusters of images. Cluster server 130 can analyze a set of images from image storage 160, automatically determine cluster groups and representative images, and present the representative images at a display device 116A.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 318 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. (Bluetooth® and ZigBee® are trademarks registered by the Bluetooth® Special Interest Group and the ZigBee® Alliance, respectively). By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 400. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system. Some of the network elements of the IPTV media system can be coupled to one or more computing devices 130, a portion of which can operate as a media processor 130. The media processors 106 and wireless communication devices 116 can be provisioned with software functions 562 and 564, respectively, to utilize the services of cluster server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 6 depicts an illustrative embodiment of a communication system 600 employing IP Multimedia Subsystem (IMS) network architecture to facilitate the combined services of circuit-switched and packet-switched systems. Communication system 600 can be utilized for automatically organizing a set of images into clusters of images. Cluster server 130 can analyze a set of images from image storage 160, automatically determine cluster groups and representative images, and present the representative images at a display device 116A.

Communication system 600 can comprise a Home Subscriber Server (HSS) 640, a tElephone NUmber Mapping (ENUM) server 630, and other network elements of an IMS network 150. The IMS network 150 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication systems 100 and 500 of FIGS. 1 and 5, respectively.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 117, a femtocell, a WiFi router, or another suitable wireless access unit to establish communications with the IMS network 150 of FIG. 6. The cellular access base station 117 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 117 may communicate directly with the IMS network 150 as shown by the arrow connecting the cellular base station 117 and the P-CSCF 616.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The cluster server 130 of FIG. 6 can be operably coupled to the second communication system 600 for purposes similar to those described above. Cluster server 130 can perform function 670 and thereby provide media services to the CDs 601, 602, 603 and 605 of FIG. 6. CDs 601, 602, 603 and 605, which can be adapted with software to perform function 672 to utilize the services of the cluster server 130. Cluster server 130 can be an integral part of the application server(s) 617 performing function 674, which can be substantially similar to function 562 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
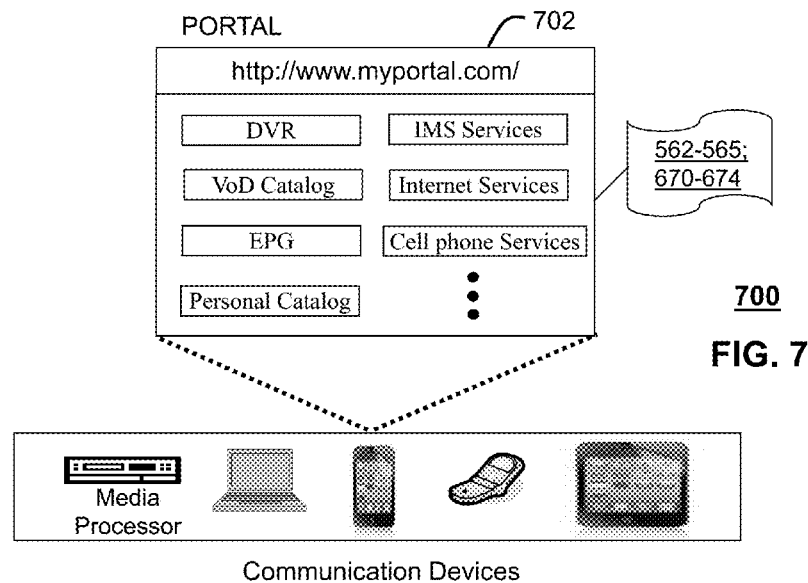
FIG. 7 depicts an illustrative embodiment of a web portal for configuring a cluster server for collecting and organizing images into cluster groups according to the communication systems of FIGS. 1, 5, and 6.

FIG. 7 depicts an illustrative embodiment of a web portal 702 which can be hosted by server applications operating from the media server devices 130 of the communication system 100 illustrated in FIG. 1. Communication system 700 can be utilized automatically organizing a set of images into clusters of images. Cluster server 130 can analyze a set of images from image storage 160, automatically determine cluster groups and representative images, and present the representative images at a display device 116A. In one embodiment, the communication system 700 can perform as a portal for configuring operations of a cluster server 130 and/or a media processing device 106.

The web portal 702 can be used for managing services of communication systems 100, 500, and/or 600. A web page of the web portal 702 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1, 3, and 6. The web portal 702 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 702 can also be used for provisioning IMS services described earlier, provisioning Internet services, provisioning cellular phone services, and so on.

The web portal 702 can further be utilized to manage and provision software applications 562-565, and 670-674 to adapt these applications as may be desired by subscribers and service providers of communication systems 100, 600, and/or 700.

Figure 8:
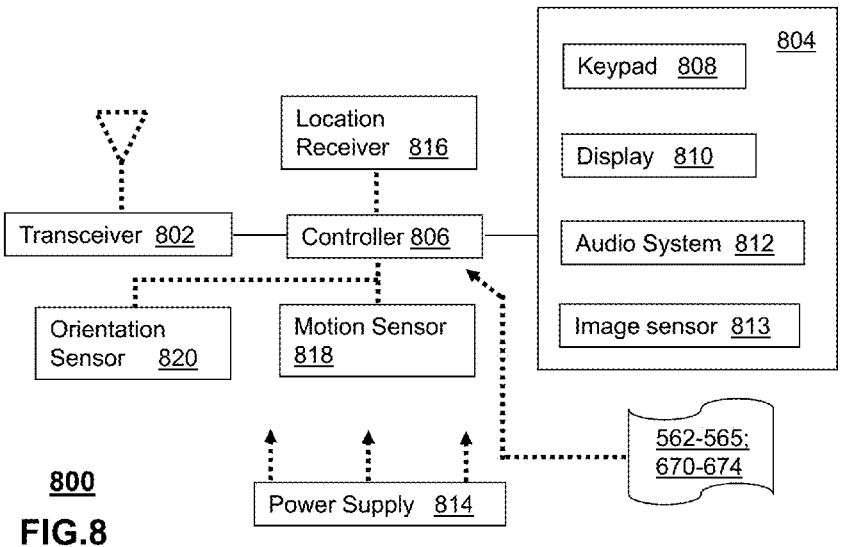
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 5, and 6. In one embodiment, the communication device 800 can be a mobile communication device 116A that communicates with a cluster server 130. In one embodiment, a cluster server 130 can automatically organizing a set of images into clusters of images. Cluster server 130 can analyze a set of images, automatically determine cluster groups and representative images, and present the representative images at a display device 116A.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the media processor 106, the media devices 108, or the portable communication devices 116A of FIG. 1, as well as the IMS CDs 601-602 and PSTN CDs 603-605 and mobile communication devices 116 of FIG. 6. It will be appreciated that the communication device 800 can also represent other devices that can operate in communication systems 500-600 of FIGS. 5-6 such as a gaming console and a media player.

The communication device 800 shown in FIG. 8 or portions thereof can serve as a representation of one or more of the devices of the communication system 100 of FIG. 1, the communication system 500 of FIG. 5, and the communication system 600 of FIG. 6. In addition, the controller 806 can be adapted in various embodiments to perform the functions 562-565 and 670-674, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
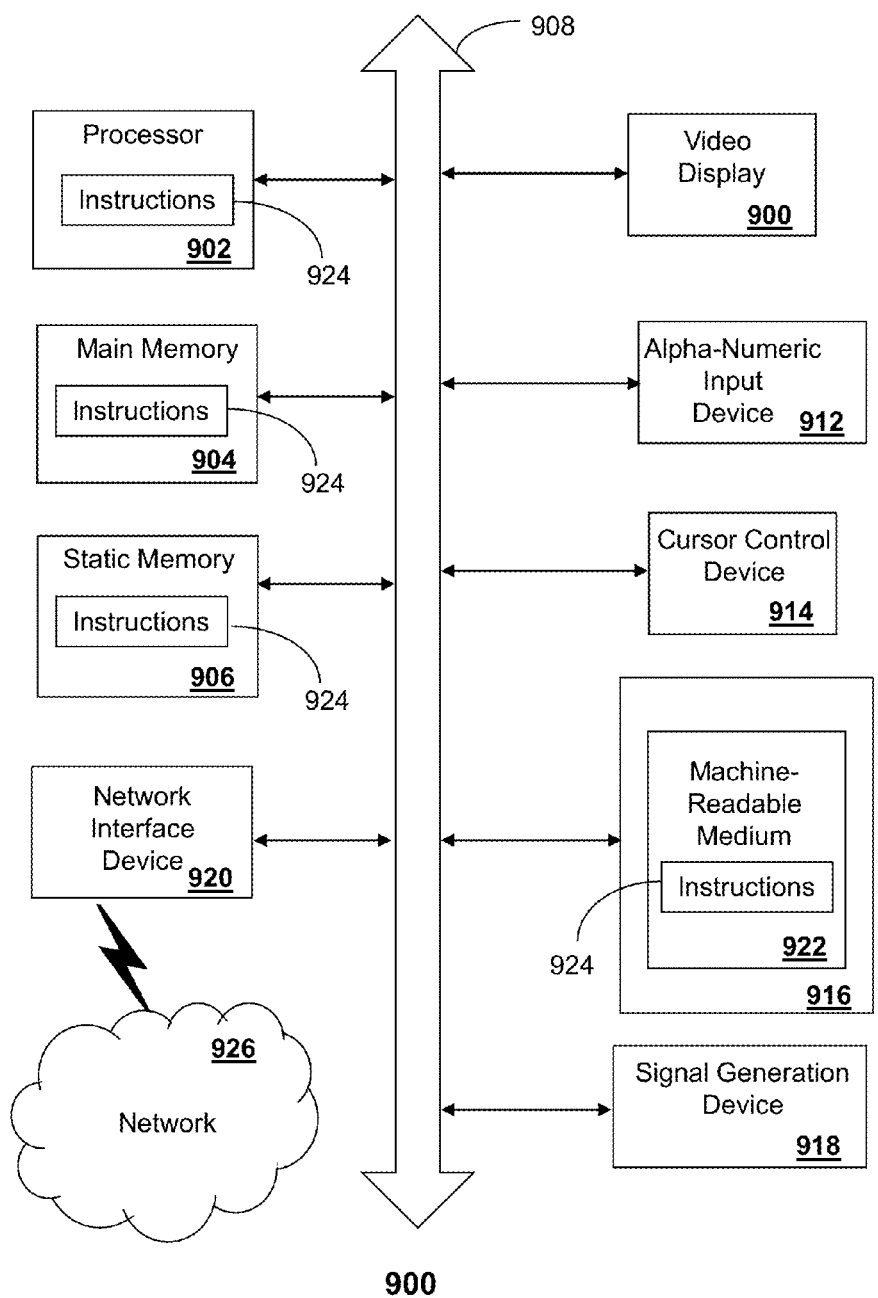
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the cluster server 130, mobile communication device 116A, gateway device 104, and/or media processor 106 of FIGS. 1, 5, and 6. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device, comprising:
a processing system including a processor; and a memory that stores executable instructions that, when executed by the processor, facilitate performance of operations, comprising:

selecting a target image from a plurality of images;

determining a measure of image loss from the target image;

filtering the target image to reconstruct the target image according to the measure of image loss resulting in a reconstructed target image;

determining image gradient information for a plurality of features in the plurality of images including the reconstructed target image, wherein the image gradient information includes measurements of directional changes in image intensity of the plurality of images;

detecting the plurality of features present in the plurality of images according to the image gradient information;

identifying, from the plurality of features, a plurality of common features of multiple images of the plurality of images;

determining, from the plurality of common features, a plurality of similarity matrices, wherein each similarity matrix comprises scores indicating relative similarities between instances of the plurality of common features in multiple images;

selecting, from the plurality of common features, a subset of common features according to the plurality of similarity matrices and corresponding scores;

accessing location information associated with capture of the plurality of images;

determining a user interest associated with a portion of the plurality of images according to the location information;

defining a plurality of cluster groups, wherein each cluster group is associated with one common feature of the subset of common features, wherein each cluster group comprises a plurality of cluster images of the plurality of images, wherein the one common feature of the subset of common features is in each of the plurality of cluster images, and wherein the plurality of cluster groups are defined based, in part, on the user interest that is associated with the portion of the plurality of images;

performing filtering on the plurality of cluster images to identify a target cluster image to represent the plurality of cluster images for each of the cluster groups; and presenting the target cluster image for each of the cluster groups.

2. The device of claim 1, wherein the operations further comprise estimating a number of cluster groups according to which one of a first plurality of cluster groups and a second plurality of cluster groups has a target cluster group performance.

3. The device of claim 2, wherein the operations further comprise:

defining a first number of cluster groups for the first plurality of cluster groups;

determining a first plurality of similarity matrices for the plurality of common features for first common cluster groups of the first plurality of cluster groups;

defining a second number of cluster groups for the second plurality of cluster groups;

determining a second plurality of similarity matrices for the plurality of common features for second common cluster groups of the second plurality of cluster groups; and comparing the first plurality of similarity matrices and the second plurality of similarity matrices.

4. The device of claim 1, wherein the filtering comprises a no-reference analysis of the plurality of cluster images.

5. The device of claim 1, wherein the filtering comprises identifying the target cluster image based on image blur.

6. The device of claim 1, wherein the filtering comprises identifying the target cluster image based on compression artifacts.

7. The device of claim 1, wherein the filtering comprises:

identifying a plurality of faces in the plurality of cluster images; and determining which of the plurality of faces comprises a frontal orientation.

8. The device of claim 1, wherein the operations further comprise:

receiving a new image;

detecting new features present in the new image;

updating, from the new features, the plurality of common features of the new image and of the multiple images to generate a new plurality of common features;

updating, from the new plurality of common features, the plurality of similarity matrices to generate a new plurality of similarity matrices;

updating, from the new plurality of common features, a new subset of common features according to the new plurality of similarity matrices; and generating a new plurality of cluster groups according to the new plurality of similarity matrices and the new subset of common features.

9. The device of claim 1, wherein the plurality of images comprise samples from a video.

10. The device of claim 1, wherein the operations further comprise:

receiving a selection of a first target cluster image of a group of target cluster images associated with a first cluster group of the plurality of cluster groups; and providing access to a first plurality of cluster images of the first cluster group according to the selection.

11. The device of claim 1, wherein the operations further comprise accessing interest information associated with images of interest, wherein the selecting of the subset of common features according to the plurality of similarity matrices is based on the interest information.

12. The device of claim 1, wherein a first cluster group of the plurality of cluster groups is arranged according to a timeline.

13. The device of claim 1, wherein a first cluster group of the plurality of cluster groups is arranged according to an event.

14. The device of claim 1, wherein a first cluster group of the plurality of cluster groups is further associated with a second subset of common features.

15. A non-transitory machine-readable storage medium, comprising executable instructions that, responsive to being executed by a processing system including a processor, facilitate performance of operations, comprising:

selecting a target image from a plurality of images;

determining a measure of image loss from the target image;

filtering the target image to reconstruct the target image according to the measure of image loss resulting in a reconstructed target image;

obtaining image gradient information for common features in the plurality of images including the reconstructed target image, wherein the image gradient information includes measurements of directional changes in image intensity of the plurality of images;

identifying the common features present in the plurality of images according to the image gradient information;

determining, from the common features of the plurality of images, similarity matrices, wherein each similarity matrix comprises scores indicating relative similarities between instances of the common features for multiple images of the plurality of images;

selecting, from the common features, a subset of common features according to the similarity matrices and corresponding scores;

accessing location information associated with capture of the plurality of images;

determining a user interest associated with a portion of the plurality of images according to the location information;

defining cluster groups associated with the subset of common features, wherein each cluster group comprises cluster images of the plurality of images, wherein the subset of common features are in each of the cluster images, and wherein the cluster groups are defined based, in part, on the user interest that is associated with the portion of the plurality of images;

performing filtering on the cluster images for each of the cluster groups to identify a target cluster image to represent the cluster images; and presenting the target cluster image for each of the cluster groups.

16. The non-transitory machine-readable storage medium of claim 15, wherein the operations further comprise estimating a number of cluster groups according to which one of a first plurality of cluster groups and a second plurality of cluster groups has a target cluster group performance.

17. The non-transitory machine-readable storage medium of claim 15, wherein the operations further comprise:
receiving a new image;
detecting new features present in the new image;
updating, from the new features, the common features in the new image and in the multiple images to generate new common features;
updating, from the new common features, the similarity matrices to generate new similarity matrices;
updating, from the new common features, a new subset of common features according to the new similarity matrices; and generating new cluster groups according to the new similarity matrices and the new subset of common features.

18. A method, comprising:
selecting, by a processing system including a processor, a target image from a plurality of images;
determining, by the processing system, a measure of image loss from the target image;
filtering, by the processing system, the target image to reconstruct the target image according to the measure of image loss resulting in a reconstructed target image;
obtaining, by the processing system, image gradient information for common features in the plurality of images including the reconstructed target image, wherein the image gradient information includes measurements of directional changes in image intensity of the plurality of images;
detecting, by the processing system, the common features present in the plurality of images according to the image gradient information;
determining, by the processing system, a subset of the common features of the plurality of images according to similarity matrices, wherein each similarity matrix comprises scores indicating relative similarities between instances of common features of multiple images of the plurality of images;
determining, by the processing system, a user interest associated with a portion of the plurality of images according to location information associated with capture of the plurality of images;
defining, by the processing system, cluster groups associated with the subset of the common features, wherein each cluster group comprises cluster images of the plurality of images, wherein the subset of the common features are present in each the cluster images and wherein the cluster groups are defined based, in part, on the user interest that is associated with the portion of the plurality of images; and
performing, by the processing system, filtering on the cluster images to identify a target cluster image to represent the cluster images for each of the cluster groups.

19. The method of claim 18, wherein the filtering comprises a non-reference filtering method.

20. The method of claim 18, further comprising estimating, by the processing system, a number of cluster groups according to which one of a first plurality of cluster groups and a second plurality of cluster groups has a target cluster group performance.

* * * * *